(12) United States Patent
Sera

(10) Patent No.: US 7,330,827 B2
(45) Date of Patent: Feb. 12, 2008

(54) NETWORK COMMERCE SYSTEM, ORDERER TERMINAL USING THE SAME, PRODUCING/PROCESSING TERMINAL, HEADQUARTERS TERMINAL AND PAYMENT SYSTEM, AND COMMERCING METHOD

(75) Inventor: Yoshinobu Sera, Tokyo (JP)

(73) Assignee: NEC Infrontia Corporation (JP)

( * ) Notice: Subject to any disclaimer, the term of this patent is extended or adjusted under 35 U.S.C. 154(b) by 1334 days.

(21) Appl. No.: 09/855,149

(22) Filed: May 14, 2001

(65) Prior Publication Data
US 2001/0042027 A1 Nov. 15, 2001

(30) Foreign Application Priority Data
May 15, 2000 (JP) .............................. 2000-142135

(51) Int. Cl.
*G06Q 30/00* (2006.01)
(52) U.S. Cl. ...................................................... 705/26
(58) Field of Classification Search .................. 705/26
See application file for complete search history.

(56) References Cited

U.S. PATENT DOCUMENTS

| 4,797,818 | A  | * | 1/1989 | Cotter ........................ | 705/15 |
| 6,512,570 | B2 | * | 1/2003 | Garfinkle et al. ............. | 355/40 |
| 6,594,641 | B1 | * | 7/2003 | Southam ...................... | 705/26 |
| 6,853,461 | B1 | * | 2/2005 | Shiimori ..................... | 358/1.15 |

FOREIGN PATENT DOCUMENTS

| EP | 0961451 | * | 1/1999 |
| WO | WO 0152143 | * | 7/2001 |

OTHER PUBLICATIONS

PR Newswire, "Successful introduction leads Quikorder to market its resturant home delivery web site service nationally", dated Sep. 29, 1999.*

* cited by examiner

*Primary Examiner*—Mark Fadok
(74) *Attorney, Agent, or Firm*—Hayes Soloway P.C.

(57) ABSTRACT

A network commerce system is provided that determines a seller that sells items by considering the location of a recipient. The network commerce system includes an orderer terminal 10 handled by an orderer ordering items, and a plurality of producing/processing terminals 30 and 30' each handled by a producer and processor which produces and processes items in accordance with orders from the orderer terminal 10. In the network commerce system, the orderer terminal 10 and the producing/processing terminals 30 and 30' are interconnected via the network 100. The network commerce system includes a headquarters terminal 20 having a receiver 22 that receives an order transmitted from the orderer terminal 10 via the network 100 and a transmitter 23 that transmits an order received by the receiver 22 to the producing/processing terminal 30' via the network 100. The headquarters terminal 20 selectively determines the producing/processing terminal 30' and makes it produce and process items.

18 Claims, 5 Drawing Sheets

FIG. 4

| | | | | | | |
|---|---|---|---|---|---|---|
| MATERIAL | PHOTOGRAPHIC PAPER | | T-SHIRT | | PLATE (EARTHENWARE) | |
| SIZE | L | 7" X 5" SIZE | S M L LL | | 15cm | 20cm |
| • NUMBER OF PAPERS | ☐ | ☐ | ☐ ☐ ☐ | | ☐ | ☐ |

- CAPTION  WITH ☐  WITHOUT ☐
  - LOCATION  UPPER ☐  LOWER ☐  LEFT ☐  RIGHT ☐
  - CONTENT  [ ▼ ]

- ADDED PATTERN  SEASON ☐  EMOTION ☐  NATURE ☐  SYMBOL ☐

- FRAME  WITH ☐  WITHOUT ☐

- DESTINATION  [                    ]

- BANK ACCOUNT NO.  [                    ]

FIG. 5

| | | | | | | | |
|---|---|---|---|---|---|---|---|
| MATERIAL | PHOTOGRAPHIC PAPER | | T-SHIRT | | | PLATE (EARTHENWARE) | |
| SIZE | L | 7" X 5" SIZE | S | M | L | LL | 15cm | 20cm |
| • NUMBER OF PAPERS | ☐ | 1 | ☐ | ☐ | ☐ | ☐ | ☐ | ☐ |
| • CAPTION | WITH ■ | WITHOUT ☐ | | | | | |
| LOCATION | UPPER ☐ | LOWER ■ | LEFT ☐ | RIGHT ☐ | | | |
| CONTENT | DEAR GRANDMA! IT IS TARO AT THE ATHLETEC MEET IN XX ELEMENTARY SCHOOL ON OCTOBER 10TH | | | | | | |
| • ADDED PATTERN | SEASON ☐ | EMOTION ■ | NATURE ☐ | SYMBOL ☐ | | | |
| • FRAME | WITH ☐ | WITHOUT ■ | | | | | |
| • DESTINATION | ... ○ ○ WARD IN TOKYO | | | | | | |
| • BANK ACCOUNT NO. | XX BANK 123456 ORDINARY ACCOUNT | | | | | | |

NETWORK COMMERCE SYSTEM, ORDERER TERMINAL USING THE SAME, PRODUCING/PROCESSING TERMINAL, HEADQUARTERS TERMINAL AND PAYMENT SYSTEM, AND COMMERCING METHOD

BACKGROUND OF THE INVENTION

The present invention relates to a network commerce system and a network commerce method. Particularly, the present invention relates to a network commerce system and network commerce method, each which edits digital data.

Information processing units such as personal computers as well as communication lines such as the Internet interconnecting information processing units using a public telephone line or ISDN (Integrated Services Digital Network) have become widespread. Conventionally, with the increasing widespread, the network commerce has been performed to order items or services via a network, using an information processing unit, in addition to TV shopping, and purchases them in accordance with the order.

The network commerce performs an order for a photo finishing service, an order and purchase of items through a catalog, and a trade of stocks through a securities firm. Recently, there is the network commerce system that can purchase items through one click operation. That is, a buyer once registers, for example, its name, its address, and its telephone number through a home page opened by an item supplier and purchases items. Thereafter, in the next purchase of an item supplied by the same supplier, the buyer can purchase the item by merely clicking once the button of the mouse connected to a personal computer, without re-registering its name on the home page.

However, recently, since there are a variety of items or services to be dealt through the network, a buyer has to often consume much time to retrieve sellers handling desired items over the network and to determine a specific one among many retrieved sellers. Improvement has been long awaited to solve this problem.

In actuality, a buyer may be different from the recipient of an item. The location of the buyer may be different from that of the recipient. For fast delivery of items and reduction of delivery costs, it is desirable to determine sellers handling desired items by considering the location of a recipient of items. Moreover, a system that can selectively determine sellers capable of accepting the requirements of a buyer, e.g. the quick delivery of items or producing and processing items at low costs is desired.

SUMMARY OF THE INVENTION

The present invention is made to solve the above-mentioned problems. An object of the present invention is to provide a network commerce system capable of purchasing items, without retrieving, on the network, sellers that treat items desired by buyers. Another object of the present invention is to provide a network commerce method capable of purchasing items, without retrieving, on the network, sellers that treat items desired by buyers.

Still another object of the present invention is to provide a network commerce system and network commerce method, each which can determine a seller selling items, by considering conditions, for example, the location of a recipient receiving items, required by a buyer.

In order to achieve the above-mentioned objects, a network commerce system of the present invention comprises an orderer terminal handled by an orderer ordering an item or service; a plurality of producing/processing terminals each which is handled by a producer/processor. The producer/processor produces and processes the item or provides a produced and processed item, in accordance with an order from the orderer terminal. The orderer terminal and the producing/processing terminal are interconnected via the network. The network commerce system further comprises a headquarters terminal including a receiver for receiving an order from the orderer terminal transmitted via the network and a transmitter for transmitting the order received by the receiver to a producing/processing terminal via the network. The headquarters terminal selectively determines the producing/processing terminal in accordance with a received order and then makes the selected producing/processing terminal produce and process the item or provide a produced and processed item.

Moreover, according to the present invention, a headquarters terminal comprises orderer terminals each handled by an orderer ordering an item or service; a plurality of producing/processing terminals each which is handled by a producer/processor which produces and processes the item or supplies a produced/processed item, in accordance with an order from each of the orderer terminals; and a headquarters terminal. The head quarters terminal includes a receiver for receiving an order transmitted from the orderer terminal via the network; a transmitter for transmitting an item received by the receiving means to a producing/receiving terminal via the network; and means for selectively determining the producing/processing terminal in accordance with a received order and then making the producing/processing terminal produce and process said item or making the selected producing/processing terminal supply the produced/processed item. Thus, a network commerce is performed between the orderer terminal and the producing/processing terminal connected via a network.

Moreover, according to the present invention, a producing/processing terminal comprises orderer terminals each handled by an orderer ordering an item or service; a plurality of producing/processing terminals each which is handled by a producer/processor which produces and processes the item or supplies a produced/processed item, in accordance with an order from each of the orderer terminals; and a headquarters terminal. The headquarters terminal includes a receiver for receiving an order transmitted from an orderer terminal via the network; a transmitter for transmitting an order received by the receiver to a producing/processing terminal via the network; and means for selectively determining the producing/processing terminal in accordance with a received order and then making the producing/processing terminal produce and process the item or supply the produced/processed item. Thus, a network commerce is performed between the orderer terminal and the producing/processing terminal connected via a network.

Moreover, the present invention relates to an orderer terminal used in a network commerce system. The network commerce system comprises orderer terminals each handled by an orderer ordering an item or service; a plurality of producing/processing terminals each which is handled by a producer/processor which produces and processes the item or supplies a produced/processed item, in accordance with an order from each of the orderer terminals; and a headquarters terminal. The headquarters terminal includes a receiver for receiving an order transmitted from an orderer terminal via the network; a transmitter for transmitting an item received by the receiver to a producing/receiving terminal via the network; and means for selectively determining the producing/processing terminal in accordance with a received order and then making the selected producing/processing terminal produce and process the item or supply the produced/processed item. Thus, network commerce is performed between a producing/processing terminal and the headquarters terminal connected via a network.

Moreover, the present invention relates to a payment terminal used in a network commerce system. The network commerce system comprises orderer terminals each handled by an orderer ordering an item or service; a plurality of producing/processing terminals each which is handled by a producer/processor which produces and processes the item or supplies a produced/processed item, in accordance with an order from each of the orderer terminals; and a headquarters terminal. The headquarters terminal includes a receiver for receiving an order transmitted from the orderer terminal via the network, a transmitter for transmitting an item received by the receiver to a producing/receiving terminal via the network; means for selectively determining the producing/processing terminal in accordance with a received order and then making the selected producing/processing terminal produce and process the item or supply the produced/processed item; and a payment terminal for paying a purchase charge of the item or service sold or supplied via the orderer terminal. Thus, a network commerce is performed between the orderer terminal and the producing/processing terminal and the headquarters terminal, interconnected via a network.

Moreover, the present invention relates to a network commerce method, wherein an orderer terminal orders an item or service via, a network and a producing/processing terminal sells the item or provides the service, in accordance with the order. The network commerce method comprises the steps of receiving the order transmitted from the orderer terminal via the network, using a headquarters terminal; selectively determining a producing/processing terminal for the item in accordance with the content of the received order, using the headquarters terminal; transmitting the order to the selected producing/processing terminal via the network; making the selected producing/processing terminal produce and process the item or supply the produced/processed item; and paying, when the order is received or after the produced/processed item is supplied, a purchase charge of the item or service via the orderer terminal.

BRIEF DESCRIPTION OF THE DRAWINGS

This and other objects, features and advantages of the present invention will become more apparent upon a reading of the following detailed description and drawings, in which:

FIG. 4 is a diagram illustrating image data to input an order, or digital data, to be transmitted from the headquarters terminal to an orderer terminal; and FIG. 5 is a diagram illustrating an example of inputting image data shown in FIG. 4.

DESCRIPTION OF THE EMBODIMENTS

An embodiment of the present invention will be described below by referring to the attached drawings.

Figure 1:
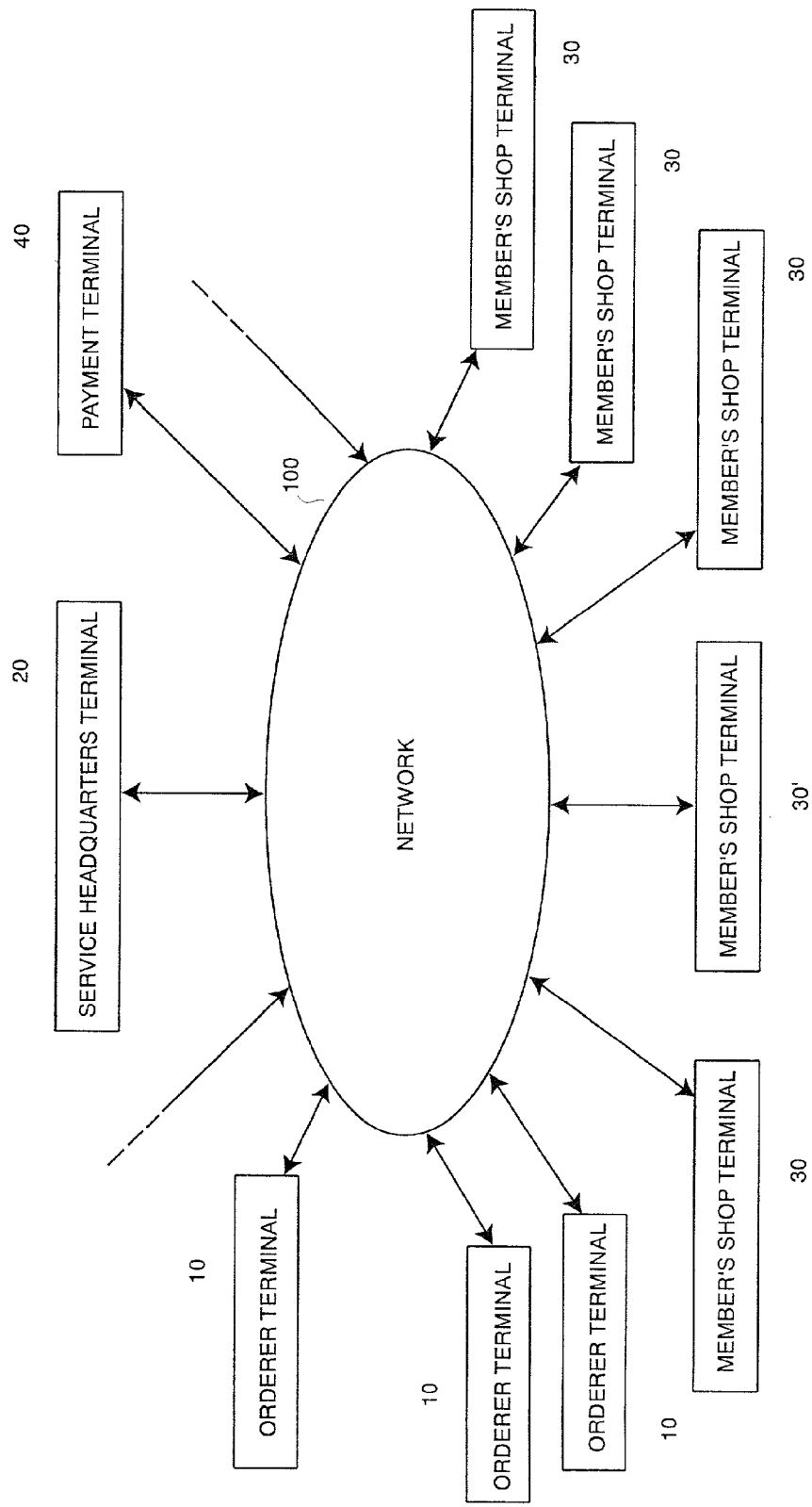
FIG. 1 is a structural diagram illustrating an electronic commerce system according to an embodiment of the present invention.

Explanation of Configuration:

FIG. 1 is a structural diagram of an electronic commerce system according to an embodiment of the present invention. Referring to FIG. 1, the electronic commerce system includes a plurality of orderer terminals 10, member's shop terminals 30 being producing/processing terminals, a service headquarters terminal 20 being a headquarters apparatus, a payment terminal 40, and a network 100 such as the internet interconnecting the above-mentioned elements.

A personal computer or workstation server is used for the orderer terminals 10 and the member's shop terminals 30. A workstation server is used for the server headquarters terminal 20. Each member's terminal 30' is handled at a member's shop, for example, a photo developer, in accordance with the order of the orderer terminal 10. Each member's terminal has the photo finishing service function and can print the photograph.

Figure 2:
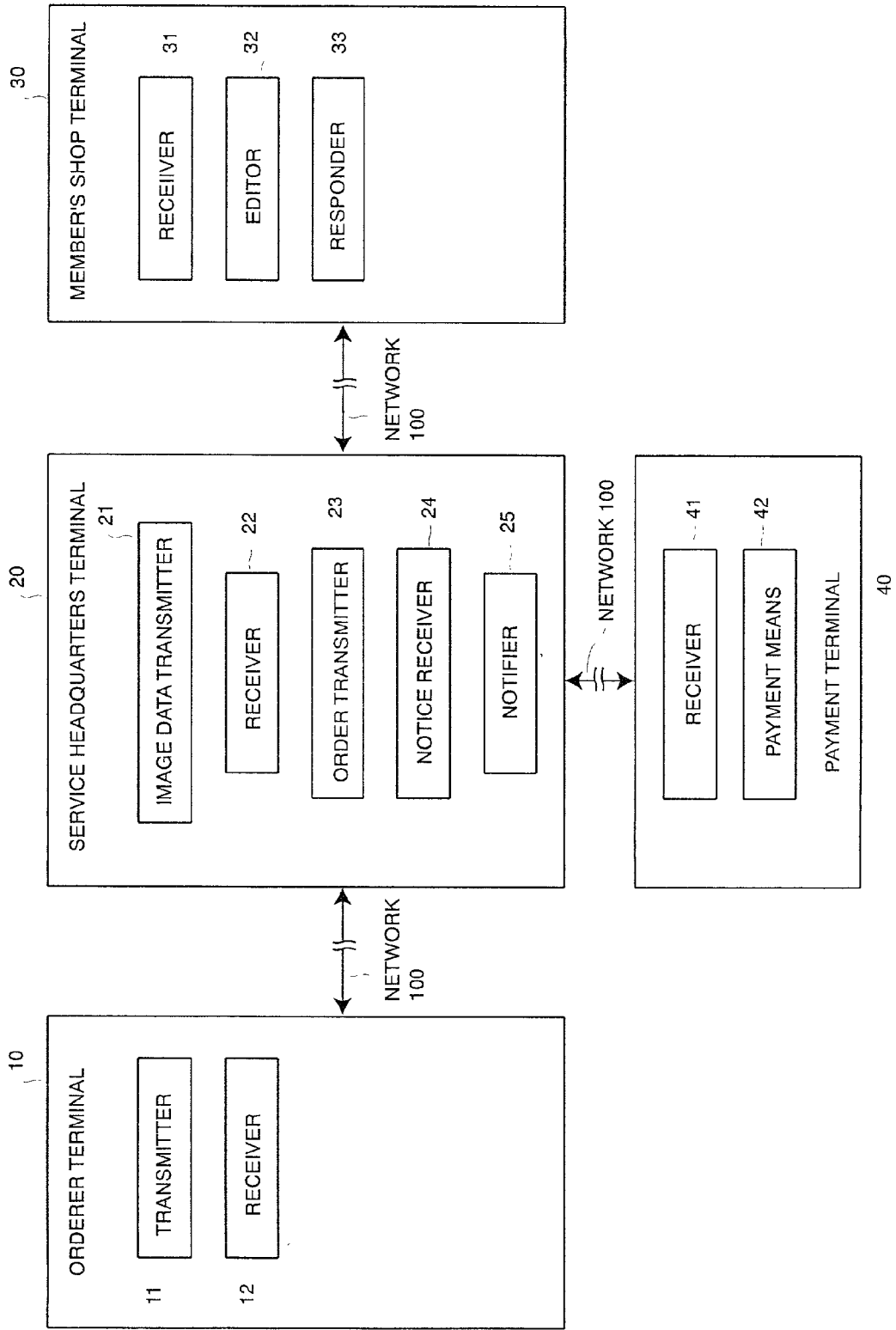
FIG. 2 is a diagram illustrating the internal structures of the orderer terminals, the service headquarters terminal, and the member's shop terminals shown in FIG. 1.

FIG. 2 is a diagram illustrating the internal configuration of an orderer terminal 10, a service headquarters terminal 20, a member's shop terminal 30, and a payment terminal 40. Referring to FIG. 2, the orderer terminal 10 includes a transmitter 11 and a receiver 12. The transmitter 11 transmits orders for image data and acoustic data in the form of digital data and requests editing for digital data, development of a photograph, and the like, to the service headquarters terminal 20 via the network 100. The receiver 12 receives a service returned from the service headquarters terminal 20.

The service headquarters terminal 20 includes an image data transmitter 21, a receiver 22, an order transmitter 23, a notice receiver 24, and a notifier 25. The image data transmitter 21 transmits image data for inputting orders for the content of edited digital data, processing content, and the like, to the orderer terminal 10 via the network 100. The receiver 22 receives digital data and orders transmitted from the orderer terminal 10. The order transmitter 23 transmits the digital data and orders to the member's shop terminal 30 selectively determined in accordance with the content of a received order. The notice receiver 24 receives a notification regarding the fact that an item edited in accordance with an order from the member's shop terminal 30 has been completely delivered and regarding the delivery expenses. The notifier 25 notifies the payment terminal 40 of a payment request notice to demand a payment of the editing charge and the delivery charge, based on the received notice.

The member's shop terminal 30 includes a receiver 31, an editor 32, and a responder 33. The receiver 31 receives digital data and an order of the orderer terminal 10 transmitted via the service headquarters terminal 20. The editor 32 edits and processes the digital data in accordance with the received order. The responder 33 returns the fact that an edited item has been delivered, to the orderer terminal 10 and to the service headquarters terminal 20.

The payment terminal 40, which is an information processing unit installed in, for example, a financial institution, includes a receiver 41 and a payment unit 42. The receiver 41 receives a notice transmitted from the service headquarters terminal 20. The payment unit 42 pays an amount of money corresponding to a received notice.

Each of the orderer terminal 10, the member's shop terminal 30, the service headquarters terminal 20, and the payment terminal 40 has a modem that transmits and receives digital data via the network 100. A URL (Uniform Resource Locator) having a specific ID and a domain name is added to a home page opened by the service headquarters terminal 20. An orderer specifies the URL using the orderer terminal IC to access the home page opened by the service headquarters terminal 20. Thus, the orderer can receive services from the member's shop terminal 30, as described later.

By directly transmitting digital orders including data and an edited content thereof, to each member's shop terminal 30 via the network 100, the orderer terminal 10 may receive services supplied from the member's shop terminals 30.

Figure 3:
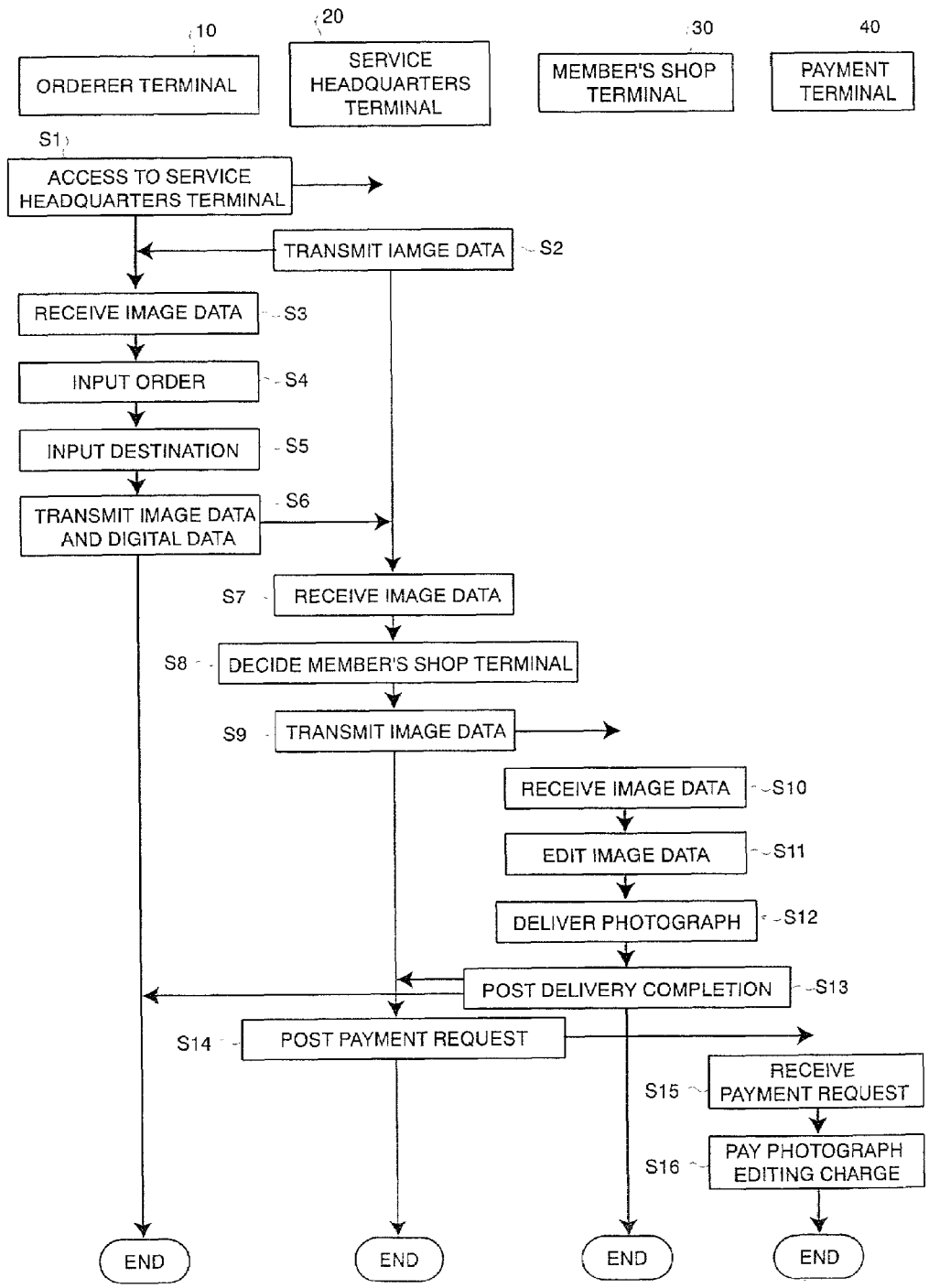
FIG. 3 is a sequence chart of the operation of the network commerce system shown in FIG. 1.

Explanation of Operation:

FIG. 3 is a sequence diagram illustrating the operation of the network commerce system shown in FIG. 1. FIG. 4 is a diagram illustrating image data for inputting an order of digital data transmitted from the service headquarters terminal 20 to the orderer terminal 30. FIG. 5 is a diagram illustrating the inputting of the image data shown in FIG. 4.

The operation of the network commerce system shown in FIG. 1 will be explained below by referring to FIGS. 3 to 5. In this example, it is assumed that the orderer terminal 10 transmits image data to which the content of the order shown in FIG. 5 is input and digital data downloaded from a digital camera to be edited in accordance with the image data, to the service headquarters terminal 20. Moreover, it is assumed that the service headquarters terminal 20 determines that the editing destination of digital data in accordance with the image data is the member's shop terminal 30.

First, an orderer uses the orderer terminal 10 and inputs the URL of a home page opened on the Internet 100 by the service headquarters terminal 20, using BROWSER. Thus, when the home page is accessed (step S1), the image data transmitter 21 in the service headquarters terminal 20 transmits, for example, image data (see FIG. 4) to the orderer terminal 10 (step S2).

When the orderer terminal 10 receives image data transmitted from the service headquarters terminal 20 (step S3), the image data is manifested on the display, as shown in FIG. 5. Orders for editing digital data, including "material" to print a photograph, "number of papers" to be printed, the presence or absence of "caption" added to a photograph, and "location" and "content" of "caption" are input (step S4).

Specifically, the orderer terminal can select as "material", for example, "photographic paper". "T-shirt" or "plate (earthenware)". The size of "material" is any one of "L", "seven-by-five size", "S", "M", "L", and "LL", and the diameter is any one of "15 cm" and "20 cm". "caption" is added to the photograph, as described later. The location of "caption" is selected from the group of "upper", "lower", "left", and "right".

Moreover, "added pattern" can be inserted in the background of a photograph. As the added pattern can be selected "season" being a static pattern imaging spring, summer, fall, or winter, "feelings (emotions)" being a dynamic pattern, "nature" being a landscape pattern such as mountain, sea, river, or field, and "symbol" formed of geometrical patterns. When "photographic paper" is selected, whether or not "photographic paper" is inserted in "frame" can be selected.

FIG. 5 shows an (example of inputting an order sheet. That is, the "caption" saying "Grandma! It is Taro at athlete meet in xxx elementary school on the October 10" is added on "lower" side of "one" photograph of a "seven-by-five" size "photographic paper". Furthermore, a pattern showing "feelings" is edited to add as the background of the photograph. The edited photograph, not placed in the "frame", is transmitted to the address ". . . ward in Tokyo".

FIG. 5 shows an example of the content of an order requiring a delivery of a photograph of an athlete meet.

However, a young couple may want to send a photograph of their grandchild printed on a T-shirt, to their parents. A plate to which a memorial photograph of a wedding ceremony is printed may be sent as a present to each guest. In such a case, the content of "caption", or "material" to which a photograph is printed may be different those shown in FIG. 5. Changed editing contents may be ordered. A repetitive document may be prepared for "caption".

Next, a destination address of a photograph after editing, a recipient's name, a bank account number of the orderer terminal 10, and the secret number thereof are input (step S5). The transmitter 11 transmits image data shown in FIG. 5 and digital data edited according to the image data, to the service headquarters terminal 20 (step S6).

In order to prevent other person from accessing and abusing the secret number, the secret number is encrypted using the SSL (Secure Socket Layer) protocol developed for TCP/IP (Transmission Control Protocol/Internet Protocol) communications or the TLS (Transfer Layer Security) protocol that compensates security of communication paths. Then, the encrypted secret number is transmitted and received via the internet 100.

When the user of the orderer terminal 10 that ordered the editing of a photograph is the same as the recipient of an edited photograph, he/she may directly receive at the member's shop installing the member's shop terminal 30, without transmitting the edited photograph. In this case, it is inputted, for example, that the orderer goes to directly receive photographs in the "destination" of the image data shown in FIG. 4.

In the service headquarters terminal 20, the receiver 22 receives the image data (FIG. 5) transmitted from the orderer terminal 10 and the digital data edited in accordance with the image data (step S7). The user of the service headquarters terminal 20 selectively determines a member's shop terminal 30' that edits digital data by referring to the content of received image data and by editing digital data in accordance with the order content (FIG. 5) from the orderer terminal 10 (step S8).

Then, the order transmitter 23 transmits image data (FIG. 5) transmitted from the orderer terminal 10 and digital data edited in accordance with the image data, to the member's shop terminal 30' via the network 100 (step S9).

In the member's shop terminal 30', the receiver 31 receives image data transmitted from the service headquarters terminal 20 and digital data edited in accordance with the image data (step S10). Then, the editor 32 edits the digital data in accordance with the order content (FIG. 5) input to the image data (step S11). Specifically, the digital data is enlarged to the "seven-by-five" size. The enlarged digital data is printed onto "photographic paper". Editing is performed to add "caption" and "added pattern" of "feelings" onto the "photographic paper".

The edited photograph is delivered to a destination input to the image data (FIG. 5) by, for example, mail (step S12). After the completion of the delivery, the responder 33 notifies the orderer terminal 10 and the service headquarters terminal 20 of the completion of the delivery.

In the service headquarters terminal 20, when the notice receiver 24 receives a notice returned from the member's shop terminal 30, the notifier 25 notifies the payment terminal 40 of a payment request. Thus, the amount of money according to the received notice is paid from the bank account of the orderer terminal 10 input to the order sheet shown in FIG. 5 (step S14). When receiving image data and digital data edited in accordance with it, the service headquarters terminal 20 may request the payment terminal 40 to make the payment.

In the payment terminal 40, the receiver 41 receives the notice (step S15). Thus, the payment section 42 deposits an expense for editing digital data and the postal charge of a paragraph from the ordinary account "No. 123456" of "xx bank" of the orderer terminal 10 into the bank account of the service headquarters terminal 20.

Now, the system including the payment section 40 has been explained as an example. However, the service headquarters terminal 20 or the payment terminal 40 may pay the digital data editing expense or the postal charge of a photograph to the orderer terminal 10 or the recipient "destination" shown in FIG. 4 by mail. The payment terminal 40 installed in the service headquarters terminal 20 may settle the account by the service headquarters terminal 20.

The example that the image data (FIG. 4) is transmitted from the service headquarters terminal 20 to the orderer terminal 10 has been explained in the above-mentioned embodiment. However, the input particulars, as shown in FIG. 4, may be further prepared to input orderer's desires including delivering items by express or producing and processing items at low cost. Thus, it is preferable that the service headquarters terminal 20 can selectively determine a member's shop terminal 30 responding to the orderer's desire.

As described above, according to the present invention, the headquarters terminal includes the transmitter that receives an order from an orderer terminal and transmits it to a specific one of producing/processing terminals. In order to selectively determine a producing/processing terminal responding to the requirement of a received order, the headquarters terminal can purchase items, without retrieving dealers selling items desired by a buyer over the network.

Moreover, according to the present invention, items or services can be delivered or provided to a person other than the user of an orderer terminal. When receiving the order from the orderer terminal, the head quarters terminal can obtain items or services. Hence, a producing/processing terminal can be determined by considering the delivery destination of items. This feature allows the delivery time of items to be shortened.

The entire disclosure of Japanese Patent No. 2000-142135 filed on May 15, 2000 including specification, claims, drawing and summary are incorporated herein by reference in its entirety.

What is claimed is:

1. A network commerce system comprising:
   an orderer terminal for interaction with an orderer ordering an item or service;
   a plurality of producing/processing terminals each for interaction with a producer/processor, said producer/processor producing and processing said item or providing a produced and processed item, in accordance with an order from said orderer terminal;
   wherein said orderer terminal and said producing/processing terminal are interconnected via said network; and
   a headquarters terminal including a receiver for receiving an image data order from said orderer terminal transmitted via said network and a transmitter for transmitting the order received by said receiver to a producing/processing terminal via said network;
   said headquarters terminal selectively determining said producing/processing terminal in accordance with a received order and then making the selected producing/processing terminal produce and process said item or provide a produced and processed item.

2. The network commerce system defined in claim 1, wherein said item or service is an item edited with digital data or editing of said digital data; and wherein said orderer terminal transmits said digital data together with said order; and wherein each of said producing/processing terminals receives said order and said digital data transmitted via said network and via said headquarters terminal and then edits said digital data in accordance with the content of said order.

3. The network commerce system defined in claim 2, wherein said digital data comprises image data or acoustic data.

4. The network commerce system defined in claim 2, further comprising a payment terminal connected to said network, for paying a purchase charge of said item sold or said service provided, via said orderer terminal.

5. The network commerce system defined in claim 2, wherein said item or said service is delivered or supplied to a destination other than said orderer.

6. The network commerce system defined in claim 3, further comprising a payment terminal connected to said network, for paying a purchase charge of said item sold or said service provided, via said orderer terminal.

7. The network commerce system defined in claim 3, wherein said item or said service is delivered or supplied to a destination other than said orderer.

8. The network commerce system defined in claim 2, wherein said digital data comprises image data or acoustic data.

9. The network commerce system defined in claim 8, further comprising a payment terminal connected to said network, for paying a purchase charge of said item sold or said service provided, via said orderer terminal.

10. The network commerce system defined in claim 9, wherein said item or said service is delivered or supplied to a destination other than said orderer.

11. The network commerce system defined in claim 1, further comprising a payment terminal connected to said network, for paying a purchase charge of said item sold or said service provided, via said orderer terminal.

12. The network commerce system defined in claim 11, wherein said item or said service is delivered or supplied to a destination other than said orderer.

13. The network commerce system defined in claim 1, wherein said item or said service is delivered or supplied to a destination other than said orderer.

14. A network commerce system for use with a network commerce system comprising:
   orderer terminals each for interaction with an orderer ordering an item or service; and
   a plurality of producing/processing terminals each for interaction with a producer/processor which produces and processes said item or supplies a produced/processed item, in accordance with an order from each of said orderer terminals;
   said headquarters terminal including:
      a receiver for receiving an order transmitted in image data form from said orderer terminal via said network;
      a transmitter for transmitting an item received by said receiving means to a producing/receiving terminal via said network; and
      a determinator for selectively determining said producing/processing terminal in accordance with a received order and then making said producing/processing terminal produce and process said item or making said selected producing/processing terminal supply said produced/processed item;

wherein network commerce is performed between said orderer terminal and said producing/processing terminal connected via a network.

15. A network commerce system for use with a network commerce system comprising:
orderer terminals each for interaction with an orderer ordering an item or service; and
a headquarters terminal including:
a receiver for receiving an order transmitted in image data form terminal via said network;
a transmitter for transmitting an order received by said receiver to a producing/processing terminal via said network; and
a determinator for selectively determining said producing/processing terminal in accordance with a received order and then making said producing/processing terminal produce and process said item or supply said produced/processed item;
wherein network commerce performed between said orderer terminal and said producing/processing terminal connected via a network, and
said producing/processing terminal comprises a plurality of producing/processing terminals each for interaction with a producer/processor which produces and processes said item or supplies a produced/processed item, in accordance with an order from each of said orderer terminals.

16. a network commerce system, said network commerce system comprising:
a plurality of producing/processing terminals each for interaction with a producer/processor which produces and processes said item or supplies a produced/processed item, in accordance with an order from an orderer terminal; and
a headquarters terminal including:
a receiver for receiving an order transmitted in image data form an orderer terminal via said network;
a transmitter for transmitting an item received by said receiver to a producing/receiving terminal via said network; and
a determinator for selectively determining said producing/processing terminal in accordance with a received order and then making said selected producing/processing terminal produce and process said item or supply said produced/processed item;
wherein network commerce is performed between a producing/processing terminal and said headquarters terminal connected via a network;
wherein said orderer terminal comprises a plurality of orderer terminals each for interaction with an orderer ordering an item or service.

17. a network commerce system, said network commerce system comprising:
orderer terminals each for interacting with an orderer ordering an item or service;
a plurality of producing/processing terminals each for interacting with a producer/processor which produces and processes said item or supplies a produced/processed item, in accordance with an order from each of said orderer terminals; and
a headquarters terminal including:
a receiver for receiving an order transmitted in image data form from said orderer terminal via said network;
a transmitter for transmitting an item received by said receiver to a producing/receiving terminal via said network; and
a determinator for selectively determining said producing/processing terminal in accordance with a received order and then making said selected producing/processing terminal produce and process said item or supply said produced/processed item;
wherein said payment terminal comprises a payment terminal for paying a purchase charge of said item or service sold or supplied via said orderer terminal;
wherein network commerce is performed between said orderer terminal and said producing/processing terminal and said headquarters terminal, interconnected via a network.

18. A network commerce method, wherein an orderer terminal orders an item or service via a network and a producing/processing terminal sells said item or provides said service, in accordance with said order, the method comprising the steps of:
receiving said order transmitted in image data form from said orderer terminal via said network, using a headquarters terminal;
selectively determining a producing/processing terminal for said item in accordance with the content of said received order, using said headquarters terminal;
transmitting said order to said selected producing/processing terminal via said network;
making said selected producing/processing terminal produce and process said item or supply said produced/processed item; and
paying, when said order is received or after said produced/processed item is supplied, a purchase charge of said item or service via said orderer terminal.

* * * * *

UNITED STATES PATENT AND TRADEMARK OFFICE
CERTIFICATE OF CORRECTION

PATENT NO.       : 7,330,827 B2                                               Page 1 of 1
APPLICATION NO. : 09/855149
DATED            : February 12, 2008
INVENTOR(S)      : Sera It is certified that error appears in the above-identified patent and that said Letters Patent is hereby corrected as shown below:

Claim 15, Col. 9, line 12, "data form terminal" should be --data form from said orderer--.
Claim 16, Col. 9, line 30, "a network commerce" should be --A network commerce--.
Claim 16, Col. 9, line 39, "data form an orderer" should be --data from said orderer--.
Claim 17, Col. 10, line 1, "a network commerce" should be --A network commerce--.

Signed and Sealed this

Fourteenth Day of September, 2010

David J. Kappos
*Director of the United States Patent and Trademark Office*